US006928962B2

(12) United States Patent
Yamazaki

(10) Patent No.: US 6,928,962 B2
(45) Date of Patent: Aug. 16, 2005

(54) HOT COOLANT TYPE HEAT ACCUMULATING APPARATUS FOR A HYBRID VEHICLE AND HEAT ACCUMULATING METHOD THEREOF

(75) Inventor: Makoto Yamazaki, Susono (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 1 day.

(21) Appl. No.: 10/390,687

(22) Filed: Mar. 19, 2003

(65) Prior Publication Data

US 2004/0031452 A1 Feb. 19, 2004

(30) Foreign Application Priority Data

Apr. 3, 2002 (JP) ......................... 2002-101068

(51) Int. Cl.[7] ................................ F01P 7/02
(52) U.S. Cl. .................................. 123/41.05
(58) Field of Search ................. 123/41.05, 41.03, 123/142.5 R, 41.14; 62/437; 165/202

(56) References Cited

U.S. PATENT DOCUMENTS 6,032,869 A * 3/2000 Ito et al. ................ 237/12.3 B
6,564,757 B2 * 5/2003 Suzuki et al. ............ 123/41.14
6,598,671 B1 * 7/2003 Zeng et al. ................ 165/240

FOREIGN PATENT DOCUMENTS

JP          A 2001-65384        3/2001

* cited by examiner

Primary Examiner—Henry C. Yuen
Assistant Examiner—Hyder Ali
(74) Attorney, Agent, or Firm—Oliff & Berridge PLC

(57) ABSTRACT

A hot coolant type heat accumulating apparatus for a hybrid vehicle is provided that includes an internal combustion engine having first and second coolant circulation systems through which a coolant is circulated using power from the engine, a heat accumulation tank that recovers, via part of the second coolant circulation system, some of the coolant that has been heated by the internal combustion engine, and stores that heated coolant, and a controller. This controller automatically shuts off the internal combustion engine when a predetermined shutoff condition has been fulfilled, circulates the coolant through the second coolant circulation system while the internal combustion engine is shutoff, and inhibits recovery of the hot coolant while the internal combustion engine is shutoff by automatic shutoff.

20 Claims, 6 Drawing Sheets

HOT COOLANT TYPE HEAT ACCUMULATING APPARATUS FOR A HYBRID VEHICLE AND HEAT ACCUMULATING METHOD THEREOF

INCORPORATION BY REFERENCE

The disclosure of Japanese Patent Application No. 2002-101068 filed on Apr. 3, 2002, including the specification, drawings and abstract is incorporated herein by reference in its entirety.

BACKGROUND OF THE INVENTION

1. Field of the Invention

This invention relates to a heat accumulating apparatus for a vehicle such as an automobile, and a heat accumulating method thereof. More particularly, the invention relates to a hot coolant type heat accumulating apparatus for a hybrid vehicle, and a heat accumulating method thereof.

2. Description of the Related Art

One type of hot coolant type heat accumulating apparatus for a hybrid vehicle that has been known in the past is disclosed in Japanese Patent Laid-Open Publication No. 2001-65384, for example, which is currently being submitted for application by the applicant of this application. This hot coolant type heat accumulating apparatus recovers some of the engine coolant that has been heated by the engine after the engine has warmed up and stores it in a heat accumulation tank as hot coolant. Then during a cold start of the engine, the hot coolant type heat accumulating apparatus replaces some of the engine coolant with the hot coolant stored in the heat accumulation tank so as to warn the engine.

As a result, according to the hot coolant type heat accumulating device described above, it is possible to improve cold startability of the internal combustion engine as well as reduce exhaust emissions compared to when the hot coolant type heat accumulating apparatus is not provided.

Generally, recovery of the hot coolant by the hot coolant type heat accumulating apparatus is done by taking some of the heated engine coolant as hot coolant from the cooling system of the engine and supplying it to the heat accumulation tank, and then discharging an equal amount of coolant as the hot coolant from the heat accumulation tank and returning it to the cooling system of the engine. Further, the heated engine coolant is also used as a heat source for a heater for warming a passenger compartment when necessary, by having some of the heated engine coolant taken from the cooling system of the engine and circulated through the heater.

The coolant in the cooling system of the engine is circulated by a coolant circulation pump that is driven by operation of a rotating shaft of the engine. The hot coolant recovery and the supply of circulated heated coolant to the heater also use the circulating action of the coolant by the coolant circulation pump. Therefore, in a vehicle in which the internal combustion engine has been automatically shutoff in response to the running state of the vehicle, circulation of the heated coolant for the heater is performed by coolant circulating means for when the engine is shutoff, such as an electric pump.

Therefore, when the internal combustion engine is automatically shutoff during hot coolant recovery and the coolant circulating means for when the engine is shutoff is operated, hot coolant flows out from the heat accumulation tank from the circulating action of the coolant by the coolant circulating means for when the engine is shutoff. As a result, the temperature of the hot coolant within the heat accumulation tank drops, which may prevent an effective improvement in cold startability of the internal combustion engine as well as an effective reduction in exhaust emissions.

SUMMARY OF THE INVENTION

This invention was made in view of the foregoing problems, such as those described above, with the related hot coolant type heat accumulating apparatus for a hybrid vehicle, which is provided with an internal combustion engine having first and second coolant circulation systems through which a coolant is circulated using power from the engine; automatic shutoff means for automatically shutting off the engine when a predetermined shutoff condition has been fulfilled; coolant circulating means for when the engine is shutoff, for circulating the coolant through the second coolant circulation system while the internal combustion engine is shutoff; and a heat accumulation tank that recovers, via part of the second coolant circulation system, some of the coolant that has been heated by the internal combustion engine, and stores that heated coolant. The main point of this invention is to reduce a drop in temperature of the hot coolant within the heat accumulation tank, reduce the possibility of not being able to effectively achieve an improvement in cold startability of the internal combustion engine, and reduce the possibility of not being able to effectively reduce exhaust emissions due to that drop in the temperature of the hot coolant within the heat accumulation tank, by preventing the hot coolant from flowing out of the heat accumulation tank from the circulating action of the coolant by the coolant circulating means for when the engine is shutoff.

Therefore, as one exemplary embodiment, as an example of the invention, a hot coolant type heat accumulating apparatus for a hybrid vehicle is provided, which includes an internal combustion engine having first and second coolant circulation systems through which a coolant is circulated using power from the engine; a heat accumulation tank that recovers from the internal combustion engine, via part of the second coolant circulation system, some of the coolant that has been heated by the engine, and stores that heated coolant; and a controller. The controller automatically shuts off the internal combustion engine when a predetermined shutoff condition has been fulfilled, circulates the coolant in the second coolant circulation system while the internal combustion engine is shutoff, and inhibits recovery of the hot coolant while the internal combustion engine is shutoff by automatic shutoff.

According to another aspect of the invention, a heat accumulating method of a hot coolant type heat accumulating apparatus for a hybrid vehicle, which includes an internal combustion engine provided with first and second coolant circulation systems through which a coolant is circulated using power from the engine, and a heat accumulation tank that recovers from the internal combustion engine, via part of the second coolant circulation system, some of the coolant that has been heated by the engine, and stores that heated coolant, is provided. This heat accumulating method includes the steps of automatically shutting off the internal combustion engine when a predetermined shutoff condition has been fulfilled; circulating the coolant through the second coolant circulation system while the internal combustion engine is shutoff; and inhibiting recovery of the hot coolant during while the internal combustion engine is shutoff by automatic shutoff.

According to the hot coolant type heat accumulating apparatus for a hybrid vehicle, and the heat accumulating method thereof, such as that described above, recovery of the hot coolant while the engine is shut off by automatic shutoff is inhibited. As a result, outflow of the hot coolant from the heat accumulation tank by the circulation action of the coolant when the engine is shutoff is inhibited. Accordingly, a drop in the temperature of the hot coolant within the heat accumulation tank due to the hot coolant flowing out from the heat accumulation tank is able to be reduced. Moreover, the possibility of the not being able to effectively improve cold startability of the internal combustion engine as well as effectively reduce exhaust emissions due to that drop in the temperature of the hot coolant within the heat accumulation tank, is able to be reduced.

BRIEF DESCRIPTION OF THE DRAWINGS

The above-mentioned and other objects, features, advantages, technical and industrial significances of this invention will be better understood by reading the following detailed description of the exemplary embodiments of the invention, when considered in connection with the accompanying drawings, in which.

DETAILED DESCRIPTION OF THE PREFERRED EMBODIMENTS

In the following description and the accompanying drawings, the invention will be described in more detail in terms of exemplary embodiments.

First Exemplary Embodiment

Figure 1:
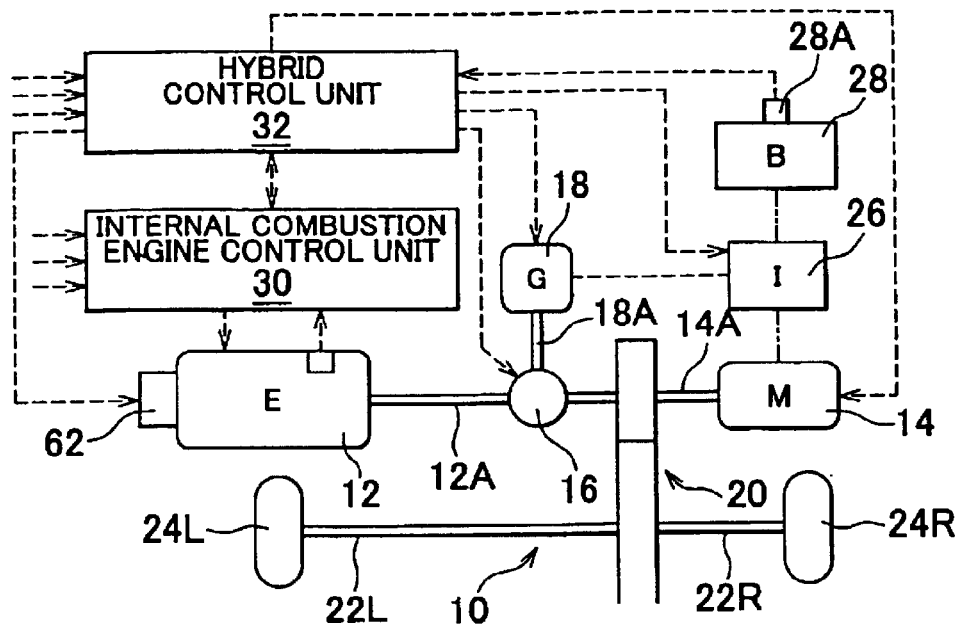
FIG. 1 is a block diagram schematically showing a hybrid apparatus into which has been incorporated a hot coolant type heat accumulating apparatus according to a first exemplary embodiment of the invention that has been applied to an apparatus that promotes warming using a hot coolant.

FIG. 1 is a block diagram schematically showing a hybrid apparatus into which has been incorporated a hot coolant type heat accumulating apparatus according to a first exemplary embodiment of the invention that has been applied to an apparatus that promotes warming using a hot coolant.

Figure 2:
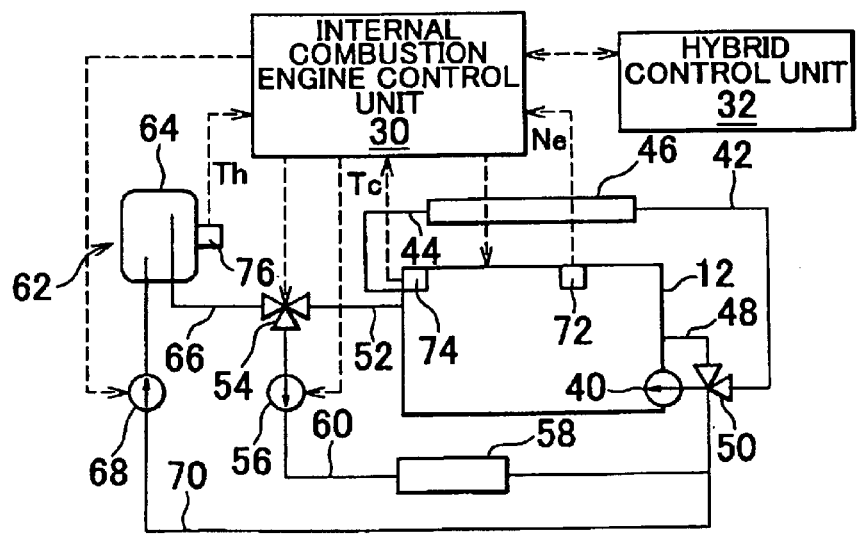
FIG. 2 is a block diagram schematically showing the hot coolant type heat accumulating apparatus according to the first exemplary embodiment of the invention, along with an internal combustion engine and a cooling system thereof.

FIG. 2 is a block diagram schematically showing the hot coolant type heat accumulating apparatus according to the first exemplary embodiment of the invention, along with an internal combustion engine and a cooling system thereof.

Referring to FIG. 1, a hybrid apparatus 10 includes an internal combustion engine 12, such as a gasoline engine, and an electric motor 14 which serves as an auxiliary power source. A output rotating shaft 12A of the internal combustion engine 12 and a rotating shaft 14A of the electric motor 14 are mechanically connected to a power distributing apparatus 16. This power distributing apparatus 16 is also mechanically connected to a rotating shaft 18A of a generator 18. The power distributing apparatus 16 includes a planetary gear set and switches between a mode that transmits power from the internal combustion engine 12 to the rotating shaft 14A, a mode that transmits power from the internal combustion engine 12 to the rotating shaft 18A, and a mode that transmits power from the internal combustion engine 12 to both the rotating shaft 14A and the rotating shaft 18A.

The rotating shaft 14A is connected to inner ends of left and right drive shafts 22L and 22R via a reduction gear 20 which is housed inside a differential gear unit. The outer ends of the drive shafts 22L and 22R are coupled to left and right driven wheels 24L and 24R via a constant velocity joint, not shown in FIG. 1. When the vehicle is running, power from the rotating shaft 14A is transmitted as driving force for running to the driven wheels 24L and 24R via the reduction gear 20 and the drive shafts 22L and 22R. When the vehicle is decelerating or braking, the rotational driving force on the driven wheels 24L and 24R from the road surface is transmitted to the rotating shaft 14A via the drive shafts 22L and 22R, and the reduction gear 20.

The electric motor 14 and the generator 18 both run on alternating current, and are electrically connected to a battery 28 via an inverter 26. The electric motor 14 receives a driving current from the battery 28 that has been converted by the inverter 26 so that it generates power when necessary. The electric motor 14 also functions as a regenerative generator during deceleration and braking. The current generated by the electric motor 14 is first converted to direct current by the inverter 26 and then supplied to the battery 28 so that the battery 28 charges. The generator 18 receives power from the internal combustion engine 12 via the power distributing apparatus 16. This in turn enables the generator 18 to generate power. The current that the generator 18 generates is either converted to direct current by the inverter 26 and then supplied to the battery 28 so that the battery 28 charges, or supplied to the electric motor 14 via the inverter 26 when necessary so as to drive the electric motor 14.

In the hybrid apparatus 10 shown in the figure, the internal combustion engine 12 is controlled by an internal combustion engine control unit 30, and the electric motor 14, the power distributing apparatus 16, the generator 18, and the inverter 26 are all controlled by a hybrid control unit 32. The internal combustion engine control unit 30 and the hybrid control unit 32 communicate the necessary signals between the electric motor 14, the power distributing apparatus 16, the generator 18, and the inverter 26, and work together in response to the running state of the vehicle to achieve a vehicle running mode. The internal combustion engine control unit 30 and the hybrid control unit 32 are each provided with a CPU, ROM, RAM, and an input/output port device, and may each be a microcomputer of a typical construction in which the CPU, ROM, RAM, and input/output port device are all interconnected by a common bus.

(A) Take-off and Low Speed Running Mode

When the vehicle is taking off (i.e., starting from a standstill) or running at low speeds, the efficiency of the internal combustion engine is low compared to other operating regions of the engine. Therefore, the electric motor 14 is driven by a driving current supplied by the battery 28 via the inverter 26 while the internal combustion engine 12 shuts off or idles, such that the vehicle runs as an electric vehicle. When the internal combustion engine 12 is cold, it idles until it reaches a certain temperature. Power from the internal combustion engine 12 is not transmitted outside the engine until that temperature is reached.

(B) Normal Running Mode

Normally when the vehicle is running, the power from the internal combustion engine 12 is distributed to the generator 18 and the reduction gear 20 by the power distributing apparatus 16. The electric motor 14 is driven by the power generated by the generator 18, and the driven wheels 24L and 24R driven by both power supplied to the reduction gear 20 by the power distributing apparatus 16 and power generated by the electric motor 14 that is supplied to the reduction gear 20.

(C) High Load Running Mode

When the vehicle is running accelerating at full throttle or running with a high load, such as up a steep slope, the power from the internal combustion engine 12 is distributed to the generator 18 and the reduction gear 20 by the power distributing apparatus 16, just as in the normal running mode. However, the electric motor 14 is driven using both the power generated by the generator 18 and the driving current supplied by the battery 28 via the inverter 26. As a result, the driven wheels 24L and 24R are driven with a large driving force.

(D) Decelerating and Braking Mode

When the vehicle is decelerating or braking, the rotational driving force that the 24L and the 24R receive from the road surface is transmitted to the electric motor 14 via the drive shafts 22L and 22R, the reduction gear 20, and the rotating shaft 14A. The electric motor 14 then functions as a regenerating generator which generates power that is supplied via the inverter 26 to the battery 28 so that the battery 28 charges.

(E) Battery Charging Mode

The battery 28 is controlled so that it is always kept in a fixed state of charge (SOC). Accordingly, when a 28A detects that the charge amount of the battery 28 has dropped to equal to, or less than, a predetermined value, the output of the internal combustion engine 12 is increased when the vehicle is in the normal running mode. At the same time, the amount of power distributed to the generator 18 by the power distributing apparatus 16 is increased. The increased amount of the power thus generated by the generator 18 is then supplied via the inverter 26 to the battery 28 so that the battery 28 charges.

(F) Economy Running Mode

When the vehicle speed drops to equal to, or less than, a predetermined value due to deceleration or braking, such as when waiting at a stoplight, for example, the internal combustion engine 12 will automatically shut off, even if an ignition switch, not shown in the figure, is on, if the temperature of the internal combustion engine 12 is equal to, or greater than a certain temperature in order to minimize wasteful fuel consumption by the internal combustion engine 12.

Although not shown in the figures, a coolant passage is provided in the internal combustion engine 12 according to a known method. This coolant passage is connected to a radiator 46 via a coolant circulation pump 40, which is driven by the rotation of the output rotating shaft 12A of the internal combustion engine 12, and conduits 42 and 44. All of these work together to form a cooling system, more particularly, a first coolant circulating system, of the internal combustion engine 12. In the FIG. 2, a bypass passage 48 bypasses the radiator 46 and a thermostat valve 50 is provided in the conduit 42.

When the coolant temperature is low, the thermostat valve 50 connects an intake side of the coolant circulation pump 40 to the bypass passage 48 so that the coolant circulates only in the coolant passage in the engine and in the bypass passage 48 and does not pass through the radiator 46. Also, when the coolant temperature rises to equal to, or greater than, a certain temperature, the thermostat valve 50 connects the intake side of the coolant circulation pump 40 with the conduit 42 so that the coolant circulates through the radiator 46 and the coolant passage in the internal combustion engine 12 in series so that it is cooled in the radiator 46.

Further, the coolant passage in the internal combustion engine 12 is connected to a three-way switch valve 54 by the conduit 52. The three-way switch valve 54 is connected to the conduit 42 between the coolant circulation pump 40 and the thermostat valve 50 by a conduit 60 that has a electric pump 56 and a heater 58 to heat a passenger compartment provided midway therein. Accordingly, the conduits 52 and 60, and the electric pump 56 and the like make up a second coolant circulation system, which serves as a hot coolant circulation system for a heater. When the heater 58 to heat a passenger compartment is operated, the three-way switch valve 54 connects the conduit 52 with the conduit 60 such that some of the coolant (hot coolant) that has been heated by passing through the coolant passage in the internal combustion engine 12, passes through the heater 58 to heat a passenger compartment, after which it returns to the internal combustion engine 12 via the conduit 60 and 42, and the coolant circulation pump 40.

Generally, the conduit 52 is connected to the cylinder head side of the internal combustion engine 12 because the rise in temperature of the engine body as the internal combustion engine 12 is operated is greater on the cylinder head side than it is on the cylinder block side. Also, according to the exemplary embodiment shown in the figure, the conduit 52 and the conduit 44 are connected separately to the coolant passage in the internal combustion engine 12. Alternatively, however, the conduit 52 and the conduit 44 may be connected to the coolant passage in the internal combustion engine 12 by a common portion.

As shown in FIG. 2, a hot coolant type heat accumulating apparatus 62 according to the invention is also provided in the cooling system of the internal combustion engine 12. This heat accumulating apparatus 62 recovers some of the coolant that was heated in the internal combustion engine 12 as hot coolant via the cooling system of the internal combustion engine 12, and then supplies this recovered hot coolant to the cooling system of the internal combustion engine 12 when the internal combustion engine 12 is cold started. As a result, because the heat accumulating apparatus 62 helps to raise the temperature of the internal combustion engine 12 in this way, it makes up a portion of the apparatus that promotes warming using a hot coolant, which promotes warming of the internal combustion engine 12.

The heat accumulating apparatus 62 includes a heat accumulation tank 64 formed of material that has a superior heat insulating capability. The heat accumulation tank 64 is connected via the conduit 66 to the three-way switch valve 54. The heat accumulation tank 64 is also connected via a conduit 70, which has a electric pump 68 provided midway therein, to the conduit 60 between the heater 58 to heat a passenger compartment and the conduit 42. Alternatively, the conduit 70 may be connected directly to the conduit 42 between the coolant circulation pump 40 and the thermostat valve 50, and the conduit 60 may be connected to the conduit 70 that is directly connected to the conduit 42.

While the ignition switch, not shown, is on, the three-way switch valve 54 connects the conduit 52 with the conduit 60 and blocks communication between the conduit 52 and the conduit 66. While hot coolant is being recovered, the three-way switch valve 54 connects the conduit 52 with the conduit 60 and the conduit 66. When the ignition switch is switched off, the three-way switch valve 54 blocks communication between the conduit 52 and the conduit 60 and connects the conduit 52 with the conduit 66.

When the heat accumulating apparatus 62 recovers hot coolant to the heat accumulation tank 64 via the cooling system of the internal combustion engine 12, the three-way switch valve 54 connects the conduit 52 with the conduit 66 while the conduit 52 and the conduit 60 are still connected. As a result, the hot coolant in the cooling system of the internal combustion engine 12 is led into the heat accumulation tank 64 via the conduit 52, the three-way switch valve 54, and the conduit 66, and the coolant within the heat accumulation tank 64 is returned to the cooling system in the internal combustion engine 12 via the conduit 70, all by the circulating action of the coolant circulation pump 40.

The three-way switch valve 54, and the electric pump 56 and electric pump 68 are all controlled by the internal combustion engine control unit 30. The internal combustion engine control unit 30 receives a signal indicative of an engine speed Ne detected by an engine speed sensor 72, as well as a signal indicative of a Tc at the outlet of the coolant passage in the internal combustion engine 12, which is detected by an engine coolant temperature sensor 74, and a signal indicative of a temperature Th of the coolant (i.e., hot coolant) in the heat accumulation tank 64 that is detected by a coolant temperature sensor 76 within the heat accumulation tank. Based on these signals, the internal combustion engine control unit 30 then operates the cooling system of the internal combustion engine 12 and the heat accumulating apparatus 62 by the modes described below.

The internal combustion engine control unit 30 and the hybrid control unit 32 also receive signals indicative of values that are detected by sensors other than the sensors described above. For the sake of simplification, however, only the sensors that detect values relating to hot coolant recovery control, to be described later, are shown in FIGS. 1 and 2.

(a) Cold Start (No Hot Coolant Supply) Mode

When the temperature Th of the hot coolant in the heat accumulation tank 64 is below a reference value during a cold start of the internal combustion engine 12, simply supplying the internal combustion engine 12 with the hot coolant in the heat accumulation tank 64 is not enough to sufficiently warm the internal combustion engine 12, so the hot coolant is not supplied. Because the temperature of the circulating coolant is low during a cold start of the internal combustion engine 12, the thermostat valve 50 connects the intake side of the coolant circulation pump 40 with the bypass passage 48, such that the coolant circulates only through the coolant passage in the internal combustion engine 12 and the bypass passage 48, and does not pass through the radiator 46. Also, the three-way switch valve 54 keeps the conduit 52 connected to the conduit 60.

(b) Cold Start (Hot Coolant Supply) Mode

When the temperature Th of the hot coolant in the heat accumulation tank 64 is equal to, or greater than, the reference value during a cold start of the internal combustion engine 12, the electric pump 68 is driven while the conduit 52 and the conduit 66 are communicated by the three-way switch valve 54. As a result, the hot coolant in the heat accumulation tank 64 is supplied to the cooling system of the internal combustion engine 12 via the conduit 66 and conduit 52, so that it replaces some of the coolant in the internal combustion engine 12, thereby promoting warming of the internal combustion engine. Even in this case, the thermostat valve 50 keeps the intake side of the coolant circulation pump 40 connected with the bypass passage 48 so the coolant circulates through the coolant passage in the internal combustion engine 12 and the bypass passage 48, but does not pass through the radiator 46. Some of this coolant is led into the heat accumulation tank 64 via the conduit 70.

(c) Normal Running Mode (Hot Coolant Recovery) Mode

When the internal combustion engine 12 has finished warming up, the thermostat valve 50 connects the intake side of the coolant circulation pump 40 with the conduit 42 such that the coolant circulates through the radiator 46 and the coolant passage in the internal combustion engine 12 in series, so that it is cooled in the radiator 46. When a predetermined condition for starting the hot coolant recovery has been fulfilled, e.g., when it has been confirmed by the coolant temperature Tc that the internal combustion engine 12 has finished warming up, the three-way switch valve 54 connects the conduit 66 with the conduit 52 for a predetermined period of time while the conduit 52 is still communicated with the conduit 60, such that the hot coolant is recovered to the heat accumulation tank 64 via the cooling system in the internal combustion engine 12 by the circulating action of the coolant circulation pump 40. In this case, the predetermined period of time is set to be the period of time necessary for all of the coolant in the heat accumulation tank 64 to be replaced by the hot coolant.

(d) Normal Running (No Hot Coolant Recovery) Mode

When recovery of the hot coolant has finished, the three-way switch valve 54 returns to the normal state in which it connects the conduit 52 with the conduit 60 and blocks communication between the conduit 52 and the conduit 66 so that the coolant is circulated through the radiator 46 and the coolant passage in the internal combustion engine 12 in series by the coolant circulation pump 40 so that it is cooled in the radiator 46.

(e) Normal Running (Heater Operated) Mode

When the heater 58 to heat a passenger compartment for heating the passenger compartment is operated, an electric fan, not shown, is driven while the conduit 52 is connected to the conduit 60 by the three-way switch valve 54. As a result, some of the coolant heated by the internal combustion engine 12 circulates through the conduits 52 and 60, thereby heating the heater 58 to heat a passenger compartment while the electric fan blows the heat from the heater 58 to heat a passenger compartment into the passenger compartment. If the hybrid apparatus 10 goes into the economy running mode and the internal combustion engine 12 automatically shuts off while the heater 58 to heat a passenger compartment is being operated, the electric pump 56 is driven so that the heated coolant continues to be circulated.

Figure 3:
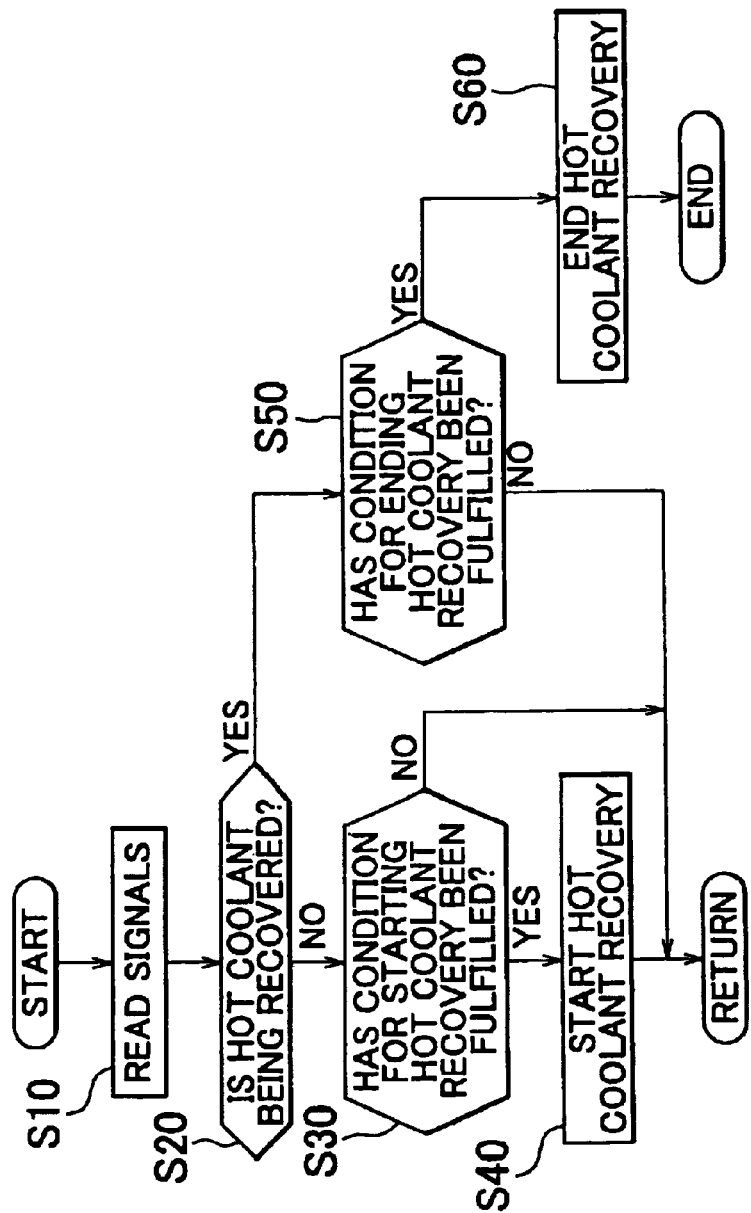
FIG. 3 is a flowchart illustrating a hot coolant recovery control routine which is executed by a control unit of the internal combustion engine according to the first exemplary embodiment of the invention.

Next, a hot coolant recovery control routine and an internal combustion engine shutoff control routine which are executed by the control unit of the internal combustion engine, according to the first exemplary embodiment of the invention will be described with reference to the flowcharts shown in FIGS. 3 and 4. The control shown in the flowcharts in these figures starts when the ignition switch, not shown, is closed (i.e., turned OFF), and is repeatedly executed at predetermined intervals of time.

First in step S10, the signals such as that indicative of the engine speed Ne detected by the engine speed sensor 72 are read. Then in step S20, it is determined whether the hot coolant is currently being recovered, i.e., it is determined whether recovery of the hot coolant to the heat accumulation tank 64 has already started. If the determination is YES, then the process proceeds on to step S50. If the determination is NO, the process proceeds on to step S30.

In step S30, it is determined whether the condition for starting hot coolant recovery has been fulfilled by determining, for example, whether the internal combustion engine 12 is running and the coolant temperature Tc detected by the engine coolant temperature sensor 74 is equal to, or greater than, a reference value. If the determination is NO, the control according to the routine shown in FIG. 3 directly ends. If the determination is YES, the three-way switch valve 54 connects the conduit 66 with the conduit 52 while the conduit 52 is still communicated with the conduit 60 such that recovery of the hot coolant to the heat accumulation tank 64 via the cooling system of the internal combustion engine 12 starts in step S40.

In step S50, it is determined whether a condition to end the hot coolant recovery has been fulfilled by determining, for example, whether a predetermined time from the start of the hot coolant recovery has passed. If the determination is NO, the control according to the routine shown in FIG. 3 directly ends. If the determination is YES, the three-way switch valve 54 blocks communication between the conduit 66 and the conduit 52 such that recovery of the hot coolant ends in step S60.

Figure 4:
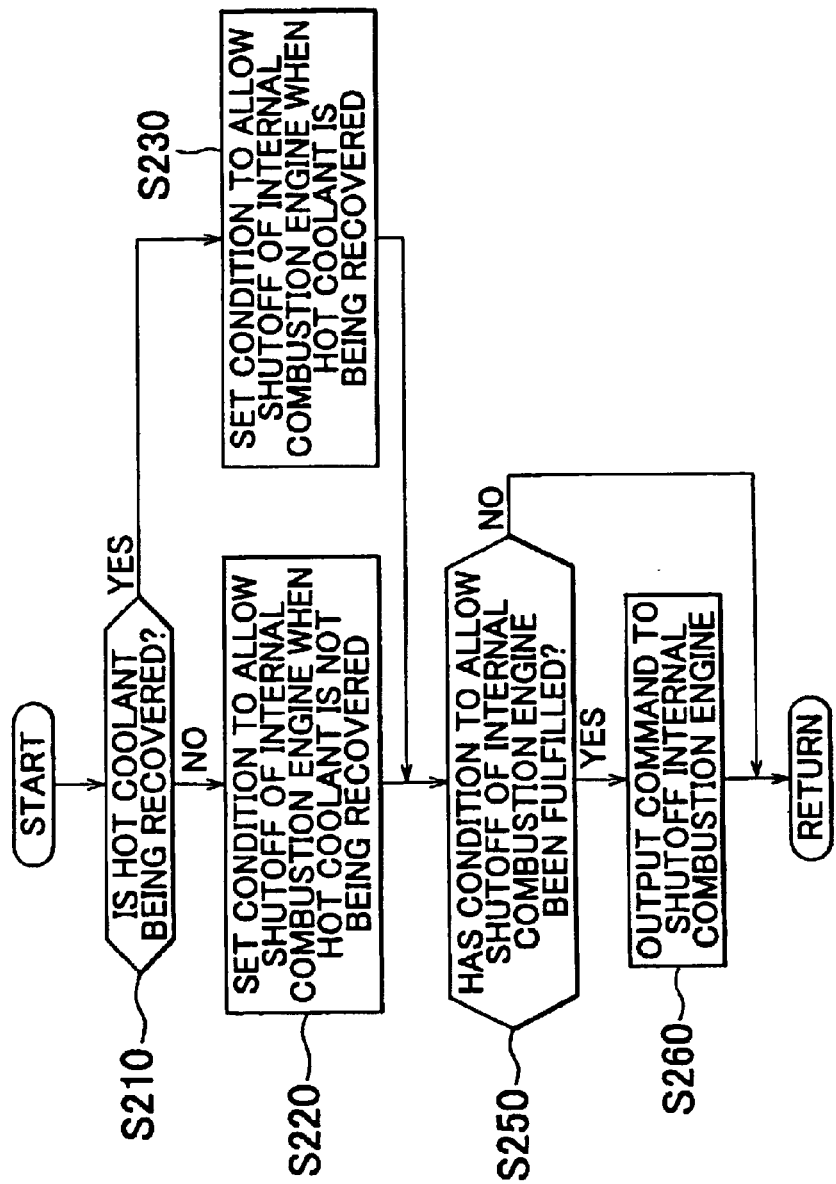
FIG. 4 is a flowchart illustrating an internal combustion engine shutoff control routine which is executed by the control unit of the internal combustion engine according to the first exemplary embodiment of the invention.

An internal combustion engine automatic shutoff control routine shown in FIG. 4 is executed as part of a power control routine. In step S210 it is determined whether the hot coolant is currently being recovered. If the determination is NO, a condition to allow shutoff of the internal combustion engine when the hot coolant is not being recovered is set in step S220. If the determination is YES, a condition to allow shutoff of the internal combustion engine when the hot coolant is being recovered is set in step S230.

In this case, the condition to allow shutoff of the internal combustion engine when the hot coolant is being recovered is more difficult to fulfill than the condition to allow shutoff of the internal combustion engine when the hot coolant is not being recovered. That is, the condition to allow shutoff of the internal combustion engine when the hot coolant is being recovered is set so that it is more difficult for the internal combustion engine 12 to automatically shut off. Also, the setting items for the condition to allow shutoff of the internal combustion engine may, for example, be vehicle speed, power required from the internal combustion engine, power required from the hybrid apparatus 10, or the like.

In step S250, it is determined whether the condition to allow shutoff of the internal combustion engine has been fulfilled. If the determination is NO, the control according to the routine shown in FIG. 4 ends without a command to shutoff the internal combustion engine 12 being output. If the determination is YES, the command to shutoff the internal combustion engine 12 is output in the power control routine.

Therefore, according to the first exemplary embodiment of the invention shown in the figures, when it has been determined in steps S20 and S30 that the condition for starting hot coolant recovery has been fulfilled, recovery of the hot coolant is started in step S40. When it has been determined in step S50 that the condition for ending hot coolant recovery has been fulfilled, recovery of the hot coolant is stopped in step S60.

Also, when recovery of the hot coolant is not being performed, the determination in step S210 is NO and the condition to allow shutoff of the internal combustion engine is set in step S220 to the normal condition for when hot coolant is not being recovered. When hot coolant is being recovered, the determination in step S210 is YES, and the condition to allow shutoff of the internal combustion engine is set in step S230 to the condition for when hot coolant is being performed, which is more difficult to fulfill than the normal condition.

Accordingly, because it is harder for the internal combustion engine to be shut off automatically when the hot coolant is being recovered than it is when the hot coolant is not being recovered, it is possible to reduce the likelihood of the hot coolant within the heat accumulation tank 64 being pumped out by the electric pump 56 when the internal combustion engine is automatically shut off and the electric pump 56 is driven while the conduit 66 is still communicated with the conduits 52 and 60 during hot coolant recovery.

In particular, according to the exemplary embodiment in the figures, when hot coolant is being recovered, the condition to allow shutoff of the internal combustion engine is set to the condition for when the hot coolant is recovered, which is a more difficult condition to fulfill than the normal condition. Moreover, automatic shutoff of the internal combustion engine 12 is not completely prohibited. As a result, the likelihood of severely inhibiting the hybrid apparatus 10 from running in the optimal running condition in response to the running state of the vehicle is able to be reduced.

Second Embodiment

Figure 5:
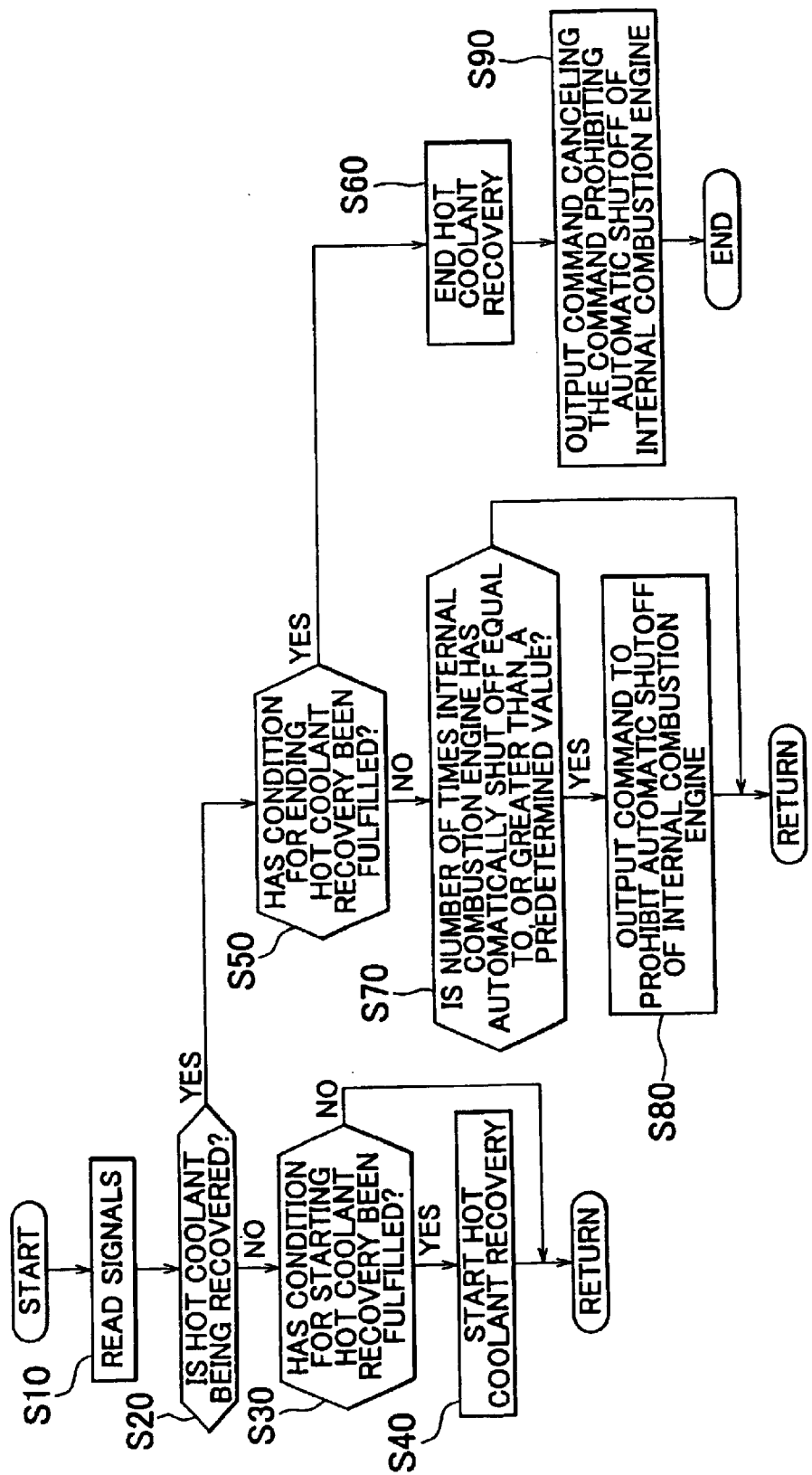
FIG. 5 is a flowchart illustrating a hot coolant recovery routine which is executed by a control unit of the internal combustion engine according to a second exemplary embodiment of the invention.
Figure 6:
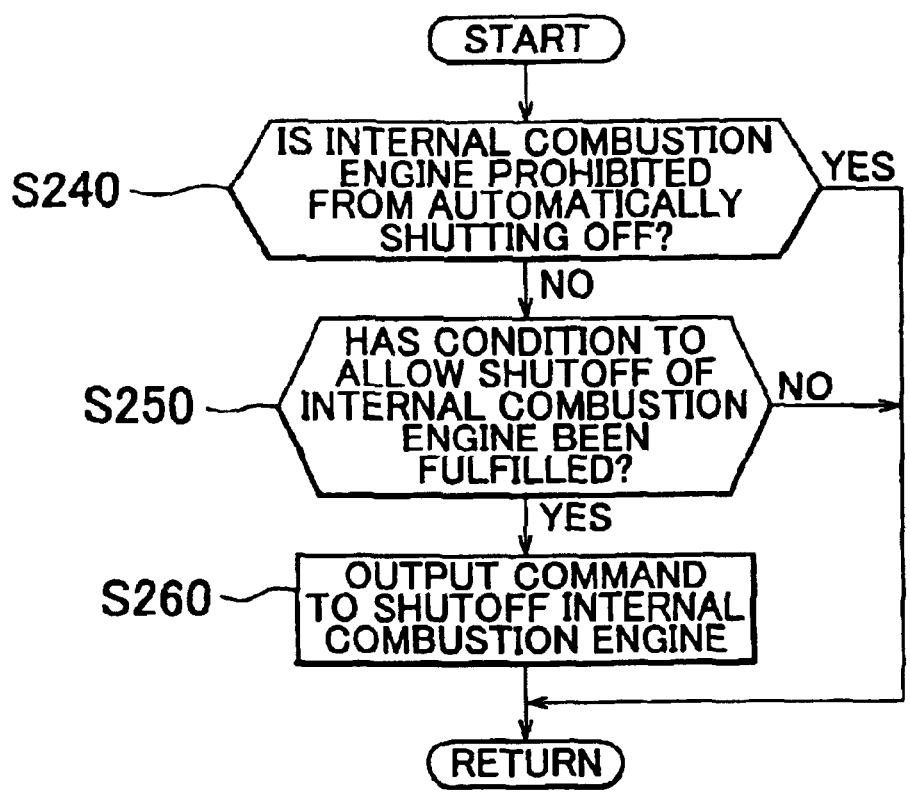
FIG. 6 is a flowchart illustrating an internal combustion engine shutoff control routine which is executed by the control unit of the internal combustion engine according to the second exemplary embodiment of the invention.

FIGS. 5 and 6 are flowcharts showing a hot coolant recovery control routine and an internal combustion engine automatic shutoff control routine, respectively, which are executed by the control unit of the internal combustion engine, according to a second exemplary embodiment of the hot coolant type heat accumulating apparatus according to the invention. In the figures, the steps that are the same as those in FIGS. 3 and 4 will be denoted by the same step numbers as in FIGS. 3 and 4.

According to the second exemplary embodiment, steps S10 through S60 are executed just as in the first exemplary embodiment described above. If the determination in step S50 is NO, it is determined in step S70 whether the number of times the engine has gone into the economy running mode (i.e., the number of times the internal combustion engine 12 has automatically shut off) during hot coolant recovery is equal to, or greater than, a predetermined value such as two, for example. If the determination is NO, the control according to the routine shown in FIG. 5 ends without a command prohibiting the engine from going into the economy running mode being output. If the determination is YES, the command prohibiting the engine from going into the economy running mode is output in the power control routine.

In step S90, which is executed after step S60, if the command prohibiting the engine from going into the economy running mode has already been output in the power control routine, a command to cancel the command prohibiting the engine from going into the economy running mode is output in the power control routine, so that the internal combustion engine 12 is once again able to be automatically shutoff.

The internal combustion engine automatic shutoff control routine shown in FIG. 6 is also executed as part of the power control routine. In step S240 it is determined whether the engine is in a state in which the economy running mode is prohibited. If the determination is YES, control according to the routine shown in FIG. 6 ends. If the determination is NO, the process proceeds on to step S250. Steps S250 and S260 are executed just as in the first exemplary embodiment described above.

Therefore, according to the second exemplary embodiment shown in the figures, when it is determined in steps S20 through S50 that the hot coolant recovery is being performed and the number of times the engine has gone into the economy running mode while the hot coolant recovery is being performed is equal to, or greater than, the predetermined number, for example, in steps S70 and S80, the engine is prohibited from going into the economy running mode. Accordingly, the determination in step S240 is YES in this case such that the determination in step S250 as to whether the internal combustion engine 12 should be automatically shutoff is not made, so the internal combustion engine 12 is prevented from being automatically shut off.

Accordingly, when the internal combustion engine 12 is automatically shut off frequently during hot coolant recovery, automatic shutoff is prevented. As a result, it is possible to reduce the likelihood of hot coolant within the heat accumulation tank 64 being pumped out by the electric pump 56 when the electric pump 56 is driven while the conduit 66 is connected with the conduits 52 and 60.

According to the first and second exemplary embodiments, there is no need for the three-way switch valve 54 to switch to block communication between the conduit 66 and the conduit 52 each time the internal combustion engine 12 automatically shuts off during hot coolant recovery. Accordingly, it is possible to reliably minimize a decrease in durability of the three-way switch valve 54 due to a high frequency of switching. Further, the hot coolant is able to be recovered more reliably and the likelihood of having to frequently perform the hot coolant recovery over again is also able to be reliably reduced compared to when hot coolant recovery is interrupted by the internal combustion engine 12 automatically shutting off.

Third Embodiment

Figure 7:
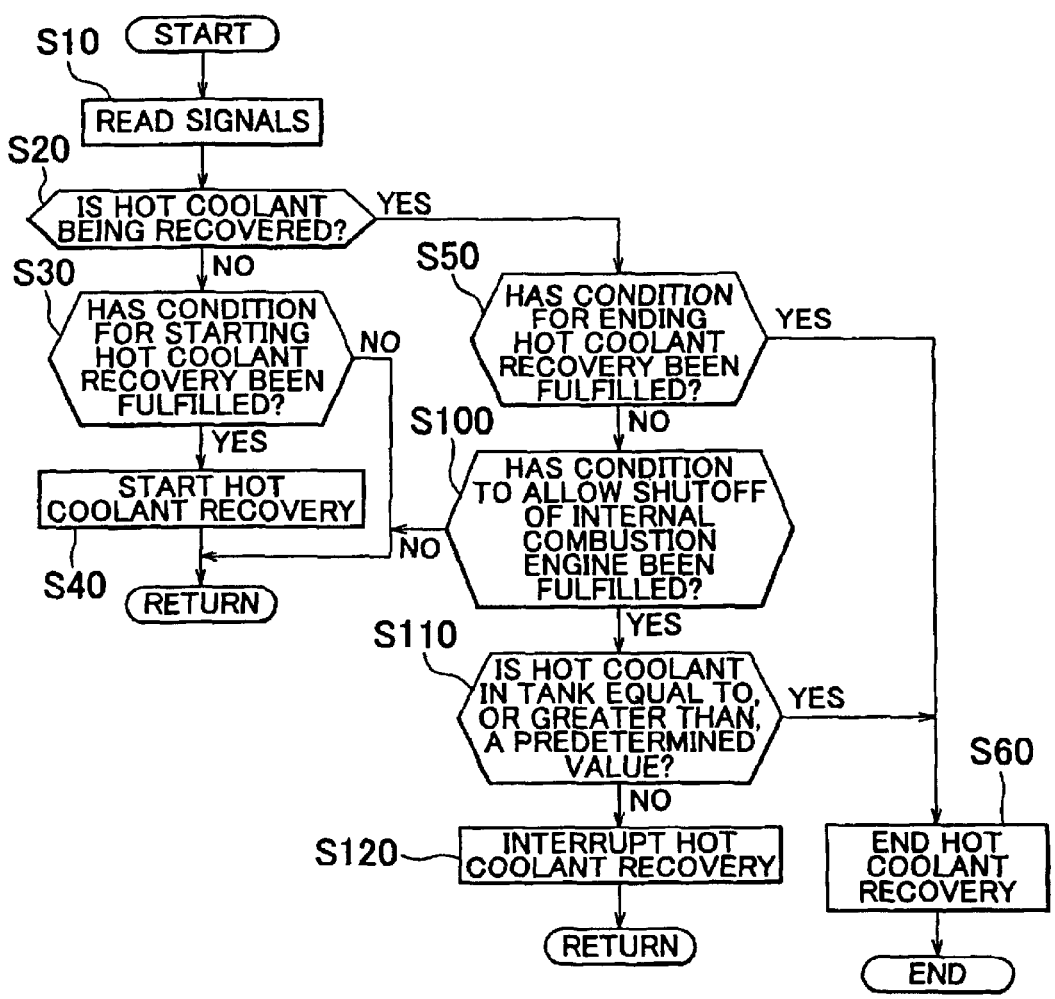
FIG. 7 is a flowchart illustrating a hot coolant recovery routine which is executed by a control unit of the internal combustion engine according to a third exemplary embodiment of the invention.

FIG. 7 is a flowchart illustrating a hot coolant control recovery routine which is executed by the control unit of the internal combustion engine, according to a third exemplary embodiment of the invention. In the figure, the steps that are the same as those in FIGS. 3 and 5 will be denoted by the same step numbers as in FIGS. 3 and 5.

In this third exemplary embodiment, steps S10 through S60 are executed just as in the first exemplary embodiment described above. If the determination in step S50 is NO, it is determined in step S100 whether the condition to allow shutoff of the internal combustion engine has been fulfilled in the power control routine, not shown in this figure. If the determination is NO, the control according to the routine shown in FIG. 7 ends. If the determination is YES, the process proceeds on to step S110.

In step S110, it is determined whether the temperature Th in the heat accumulation tank 64 is equal to, or greater than, a predetermined value The. If the determination is YES, the recovery of the hot coolant ends in step S60. If the determination is NO, the three-way switch valve 54 blocks communication between the conduit 66 and the conduit 52 so as to interrupt recovery of the hot coolant in step S120.

The predetermined value The is set to a temperature that enables cold startability of the internal combustion engine 12 to be sufficiently improved and exhaust emissions to be sufficiently reduced by supplying the hot coolant to the cooling system of the internal combustion engine 12 when the internal combustion engine 12 is cold started. Moreover, this predetermined value The is set to a temperature that is lower than a reference value thereof when the temperature Th in the heat accumulation tank 64 is included in the condition to end the hot coolant recovery.

Furthermore, when the recovery of the hot coolant has ended in step S60, the hot coolant recovery is not performed unless the hot coolant is supplied from the heat accumulation tank 64. When hot coolant recovery is interrupted in step 120, however, it is determined in step S30 that the condition to start hot coolant recovery has been fulfilled because the temperature in the heat accumulation tank 64 has not sufficiently risen. Therefore, hot coolant recovery may be performed over again, or the hot coolant recovery may be restarted until the period of time of the hot water recovery reaches a predetermined period of time.

Therefore, according to the third exemplary embodiment shown in the figure, when it is determined that the condition to allow shutoff of the internal combustion engine during hot coolant recovery has been fulfilled in steps S50 and S100, the hot coolant recovery ends (step S60) if the temperature inside the heat accumulation tank 64 has risen sufficiently (step S110). If the temperature inside the heat accumulation tank 64 has not risen sufficiently (step S110), the hot coolant recovery is interrupted (step S120).

Accordingly, when the internal combustion engine 12 is automatically shut off during hot coolant recovery, the recovery of the hot coolant stops and communication between the heat accumulation tank 64 and the conduit 60 is blocked. As a result, it is possible to reliably prevent the hot coolant within the heat accumulation tank 64 from being pumped out by the electric pump 56. Furthermore, hot coolant recovery does not affect the automatic shutoff of the internal combustion engine 12 so the internal combustion engine 12 is able to be reliably shutoff in response to the running state of the vehicle.

Although the invention has been described herein with reference to specific embodiments, many modifications and variations therein will readily occur to those skilled in the art. Accordingly, all such variations and modifications are included within the intended scope of the invention.

For example, the vehicle in all of the foregoing exemplary embodiments is a hybrid vehicle in which the internal combustion engine 12 is used as the main power source and the electric motor 14 is used as the auxiliary power source. Moreover, this hybrid vehicle is provided with the hybrid apparatus 10 which interconnects the internal combustion engine 12, the electric motor 14, and the generator 18 via the power distributing apparatus 16. The hybrid vehicle to which the hot coolant type heat accumulating apparatus according to the invention has been applied, however, may be of any configuration that is known by those skilled in the art.

Also in the first through the third exemplary embodiments, the hot coolant within the heat accumulation tank is supplied to the cylinder head side of the internal combustion engine 12 via the conduit 66 and conduit 52. Alternatively, however, the hot coolant may be supplied to the internal combustion engine 12 by other modes.

Furthermore, in the third exemplary embodiment, when the determination in step S110 is NO, the hot coolant recovery is interrupted in step S120. Alternatively, however, when the temperature Th in the heat accumulation tank 64 is below the predetermined value The, automatic shutoff of the internal combustion engine 12 may be delayed until the temperature Th in the heat accumulation tank 64 has reached the predetermined value The, or until the hot coolant recovery is complete.

While the invention has been described with reference to exemplary embodiments thereof, it is to be understood that the invention is not limited to the exemplary embodiments or constructions. To the contrary, the invention is intended to cover various modifications and equivalent arrangements. In addition, while the various elements of the exemplary embodiments are shown in various combinations and configurations, which are exemplary, other combinations and configurations, including more, less or only a single element, are also within the spirit and scope of the invention.

What is claimed is:

1. A hot coolant type heat accumulating apparatus for a hybrid vehicle, comprising:
    an internal combustion engine provided with first and second coolant circulation systems through which a coolant is circulated using power from the engine;
    a heat accumulation tank that recovers from the internal combustion engine, via part of the second coolant circulation system, some of the coolant that has been heated by the engine, and stores that heated coolant; and
    a controller that automatically shuts off the internal combustion engine when a predetermined shutoff condition has been fulfilled, circulates the coolant in the second coolant circulation system while the internal combustion engine is shutoff, and inhibits recovery of the hot coolant while the internal combustion engine is shutoff by automatic shutoff;
    a condition to allow the automatic shutoff of the internal combustion engine when the hot coolant is recovered being set to be different from a condition to allow the automatic shutoff of the internal combustion engine when the hot coolant is not recovered.

2. The hot coolant type heat accumulating apparatus for a hybrid vehicle according to claim 1, wherein the controller inhibits automatic shutoff of the internal combustion engine while the hot coolant is being recovered to the heat accumulation tank.

3. The hot coolant type heat accumulating apparatus for a hybrid vehicle according to claim 2, wherein the controller makes the condition to allow automatic shutoff of the internal combustion engine more difficult to fulfill while the hot coolant is being recovered to the heat accumulation tank than when the hot coolant is not being recovered.

4. The hot coolant type heat accumulating apparatus for a hybrid vehicle according to claim 1, wherein the controller prohibits automatic shutoff of the internal combustion engine until recovery of the hot coolant is complete when a number of times that the internal combustion engine has been automatically shut off while the hot coolant is being recovered to the heat accumulation tank is equal to, or greater than, a predetermined value.

5. The hot coolant type heat accumulating apparatus for a hybrid vehicle according to claim 1, wherein the controller ends recovery of the hot coolant and blocks communication between the heat accumulation tank and the second coolant circulation system when the internal combustion engine is automatically shut off while the hot coolant is being recovered to the heat accumulation tank.

6. The hot coolant type heat accumulating apparatus for a hybrid vehicle according to claim 5, wherein the controller ends recovery of the hot coolant and blocks communication between the heat accumulation tank and the second coolant circulation system when a temperature within the heat accumulation tank is equal to, or greater than, a predetermined value.

7. The hot coolant type heat accumulating apparatus for a hybrid vehicle according to claim 1, wherein the controller interrupts recovery of the hot coolant by blocking communication between the heat accumulation tank and the second coolant circulation system when the internal combustion engine is automatically shutoff while the hot coolant is being recovered to the heat accumulation tank.

8. The hot coolant type heat accumulating apparatus for a hybrid vehicle according to claim 7, wherein the controller interrupts recovery of the hot coolant by blocking communication between the heat accumulation tank and the second coolant circulation system when a temperature within the heat accumulation tank is below a predetermined value.

9. The hot coolant type heat accumulating apparatus for a hybrid vehicle according to claim 1, wherein the second coolant circulation system is a coolant circulation system for supplying the hot coolant to a heater for heating a passenger compartment.

10. The hot coolant type heat accumulating apparatus for a hybrid vehicle according to claim 1, wherein the hot coolant type heat accumulating apparatus comprises part of an apparatus that promotes warming using the hot coolant, which is provided with hot coolant supplying means for promoting warming of the internal combustion engine by supplying the hot coolant to a cooling system of the internal combustion engine from the heat accumulation tank during a cold start of the internal combustion engine.

11. The hot coolant type heat accumulating apparatus for a hybrid vehicle according to claim 1, wherein the heat accumulation tank is connected, via a valve device, to the second coolant circulation system, and, during normal operation, this valve device maintains communication in the second coolant circulation system and blocks communication between the heat accumulation tank and the second coolant circulation system, and during hot coolant recovery, opens communication between the heat accumulation tank and the second coolant circulation system.

12. The hot coolant type heat accumulating apparatus for a hybrid vehicle according to claim 11, wherein the second coolant circulation system includes an electric pump that operates while the internal combustion engine is shutoff by automatic shutoff.

13. The hot coolant type heat accumulating apparatus for a hybrid vehicle according to claim 1, wherein the condition to allow the automatic shutoff of the internal combustion engine when the hot coolant is recovered and the condition to allow the automatic shutoff of the internal combustion engine when the hot coolant is not recovered are determined based on at least one of vehicle speed and power required from the internal combustion engine.

14. A heat accumulating method of a hot coolant type heat accumulating apparatus for a hybrid vehicle, the hot coolant type heat accumulating apparatus for a hybrid vehicle including an internal combustion engine provided with first and second coolant circulation systems through which a coolant is circulated using power from the engine, and a heat accumulation tank that recovers from the internal combustion engine, via part of the second coolant circulation system, some of the coolant that has been heated by the engine, and stores that heated coolant, the heat accumulating method of a hot coolant type heat accumulating apparatus for a hybrid vehicle, comprising the steps of:

automatically shutting off the internal combustion engine when a predetermined shutoff condition has been fulfilled;

circulating the coolant through the second coolant circulation system while the internal combustion engine is shutoff;

inhibiting recovery of the hot coolant while the internal combustion engine is shutoff by automatic shutoff; and setting a condition to allow the automatic shutoff of the internal combustion engine when the hot coolant is recovered to be different from a condition to allow the automatic shutoff of the internal combustion engine when the hot coolant is not recovered.

15. The heat accumulating method according to claim 14, further comprising the step of inhibiting automatic shutoff of the internal combustion engine while the hot coolant is being recovered to the heat accumulation tank.

16. The heat accumulating method according to claim 14, further comprising the step of prohibiting automatic shutoff of the internal combustion engine until recovery of the hot coolant is complete when a number of times the internal combustion engine has been automatically shutoff while the hot coolant is being recovered to the heat accumulation tank is equal to, or greater than, a predetermined value.

17. The heat accumulating method according to claim 14, further comprising the step of ending recovery of the hot coolant and blocking communication between the heat accumulation tank and the second coolant circulation when the internal combustion engine is automatically shutoff while the hot coolant is being recovered to the heat accumulation tank.

18. The heat accumulating method according to claim 14, further comprising the step of interrupting recovery of the hot coolant by blocking communication between the heat accumulation tank and the second coolant circulation system when the internal combustion engine is automatically shutoff while the hot coolant is being recovered to the heat accumulation tank.

19. The hot coolant type heat accumulating method for a hybrid vehicle according to claim 14, wherein providing the condition to allow the automatic shutoff of the internal combustion engine when the hot coolant is recovered and the condition to allow the automatic shutoff of the internal combustion engine when the hot coolant is not recovered includes determining based on at least one of vehicle speed and power required from the internal combustion engine.

20. A hot coolant type heat accumulating apparatus for a hybrid vehicle, comprising:

an internal combustion engine provided with first and second coolant circulation systems through which a coolant is circulated using power from the engine;

a heat accumulation tank that recovers from the internal combustion engine, via part of the second coolant circulation system, some of the coolant that has been heated by the engine, and stores that heated coolant; and a controller that automatically shuts off the internal combustion engine when a predetermined shutoff condition has been fulfilled, circulates the coolant in the second coolant circulation system while the internal combustion engine is shutoff, and inhibits recovery of the hot coolant while the internal combustion engine is shutoff by automatic shutoff, wherein the controller prohibits automatic shutoff of the internal combustion engine until recovery of the hot coolant is complete when a number of times that the internal combustion engine has been automatically shut off while the hot coolant is being recovered to the heat accumulation tank is equal to, or greater than, a predetermined value.

* * * * *